(12) United States Patent
Orr

(10) Patent No.: US 10,998,779 B2
(45) Date of Patent: May 4, 2021

(54) FASTENING SYSTEM FOR AN ELECTRIC MACHINE

(71) Applicant: FORD GLOBAL TECHNOLOGIES, LLC, Dearborn, MI (US)

(72) Inventor: Brian Christian Orr, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 16/180,659

(22) Filed: Nov. 5, 2018

(65) Prior Publication Data

US 2020/0144879 A1 May 7, 2020

(51) Int. Cl.
| | |
|---|---|
| *H02K 5/24* | (2006.01) |
| *H02K 1/18* | (2006.01) |
| *B60K 6/405* | (2007.10) |
| *H02K 7/00* | (2006.01) |
| *B60K 6/26* | (2007.10) |

(52) U.S. Cl.
CPC .............. *H02K 1/185* (2013.01); *B60K 6/26* (2013.01); *B60K 6/405* (2013.01); *H02K 5/24* (2013.01); *H02K 7/006* (2013.01); *B60Y 2200/92* (2013.01); *B60Y 2400/604* (2013.01)

(58) Field of Classification Search
CPC .......... H02K 5/24; H02K 7/006; H02K 1/185; B60K 6/26; B60K 6/405

USPC ..... 310/216.114, 216.118, 216.131, 216.134
See application file for complete search history.

(56) References Cited

U.S. PATENT DOCUMENTS

| | | | | |
|---|---|---|---|---|
| 3,678,765 A | * | 7/1972 | Feldman ................. | G01C 19/08 74/5.46 |
| 5,952,751 A | * | 9/1999 | Yamakoshi .............. | H02K 5/04 29/596 |
| 10,160,478 B2 | * | 12/2018 | Hayashi ................. | H02K 11/33 |
| 10,177,612 B2 | * | 1/2019 | Asao ........................ | H02K 5/06 |
| 2013/0193801 A1 | * | 8/2013 | Schmid .................. | H02K 1/185 310/216.131 |
| 2016/0020678 A1 | * | 1/2016 | Hirano .................... | H02K 5/22 310/64 |
| 2018/0013325 A1 | | 1/2018 | Jakob et al. | |

FOREIGN PATENT DOCUMENTS

DE       102014016341 A1     6/2015

* cited by examiner

*Primary Examiner* — Ramon M Barrera
(74) *Attorney, Agent, or Firm* — David B. Kelley; Brooks Kushman P.C.

(57) ABSTRACT

A vehicle includes a housing, an electric machine configured to propel the vehicle, and a clamp. The housing defines an internal cavity, and has first and second stepped surfaces extending radially inward and into the cavity. The electric machine is disposed within the cavity. The electric machine has a stator that includes third and fourth stepped surfaces that extend radially outward. The clamp engages the first and third stepped surfaces, and axially forces the fourth stepped surface into engagement with the second stepped surface.

20 Claims, 5 Drawing Sheets

FASTENING SYSTEM FOR AN ELECTRIC MACHINE

TECHNICAL FIELD

The present disclosure relates to hybrid/electric vehicles and electric machines configured to propel hybrid/electric vehicles.

BACKGROUND

Hybrid/electric vehicles may include electric machines that are configured to propel the vehicle.

SUMMARY

A vehicle includes a housing, an electric machine configured to propel the vehicle, and a clamp. The housing defines an internal cavity, and has first and second stepped surfaces extending radially inward and into the cavity. The electric machine is disposed within the cavity. The electric machine has a stator that includes third and fourth stepped surfaces that extend radially outward. The clamp engages the first and third stepped surfaces, and axially forces the fourth stepped surface into engagement with the second stepped surface.

A powertrain includes a housing, an electric machine stator, and a clamp. The housing defines an internal cavity, and has first and second stepped surfaces extending radially into the cavity. The second stepped surface is radially inward of the first stepped surface. The electric machine stator has a core that extends axially between front and back surfaces. The clamp engages the first stepped surface and the back surface, and forces the front surface into engagement with the second stepped surface.

A vehicle powertrain includes a housing, an electric machine stator, and a clamp. The housing defines an internal cavity, and has first and second surfaces extending radially into the cavity. The electric machine stator has third and fourth surfaces extending radially outward. The clamp engages the first and third surfaces, and generates an axial load on the stator that forces the fourth surface into engagement with the second surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
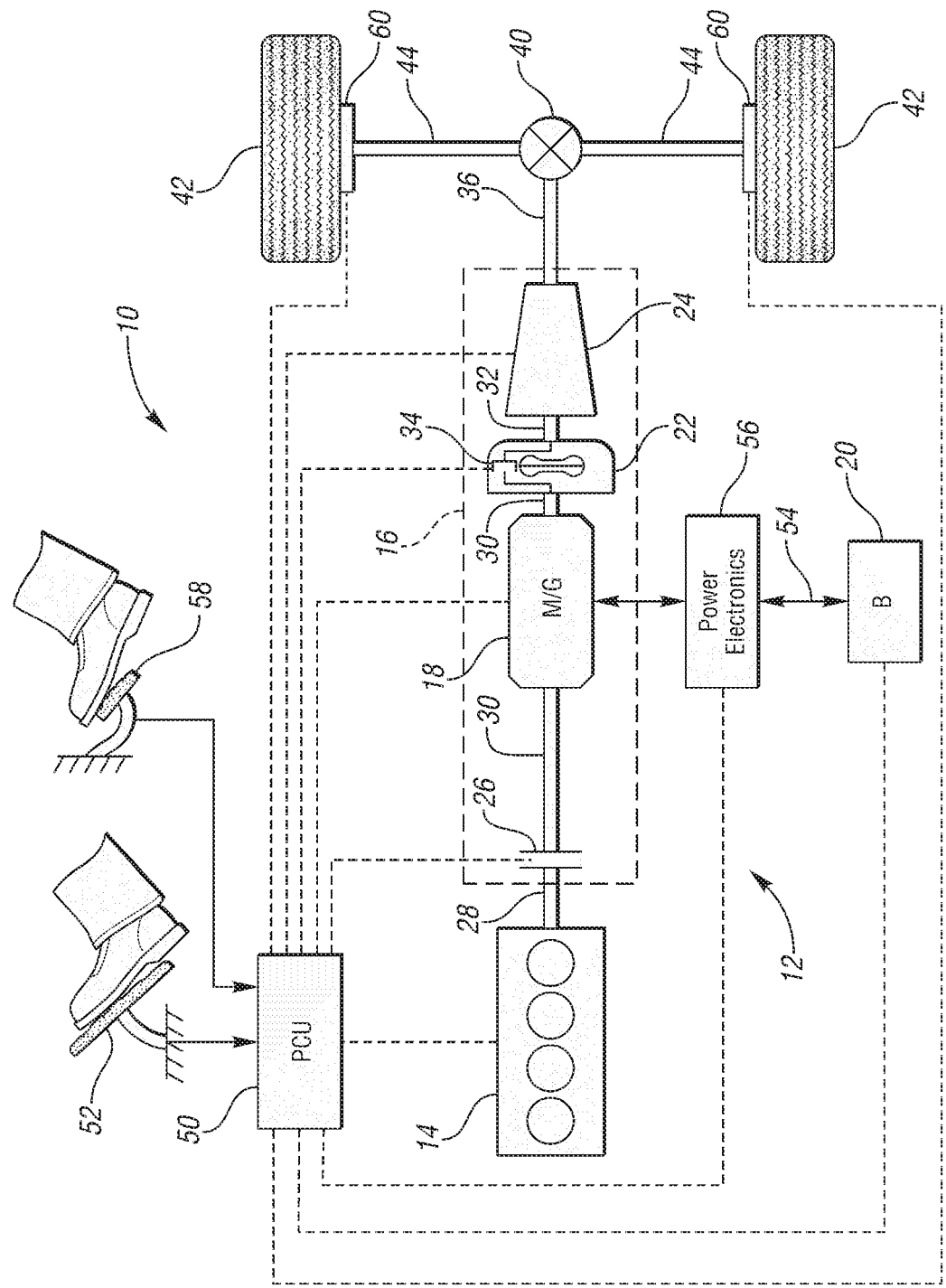
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

Figure 2:
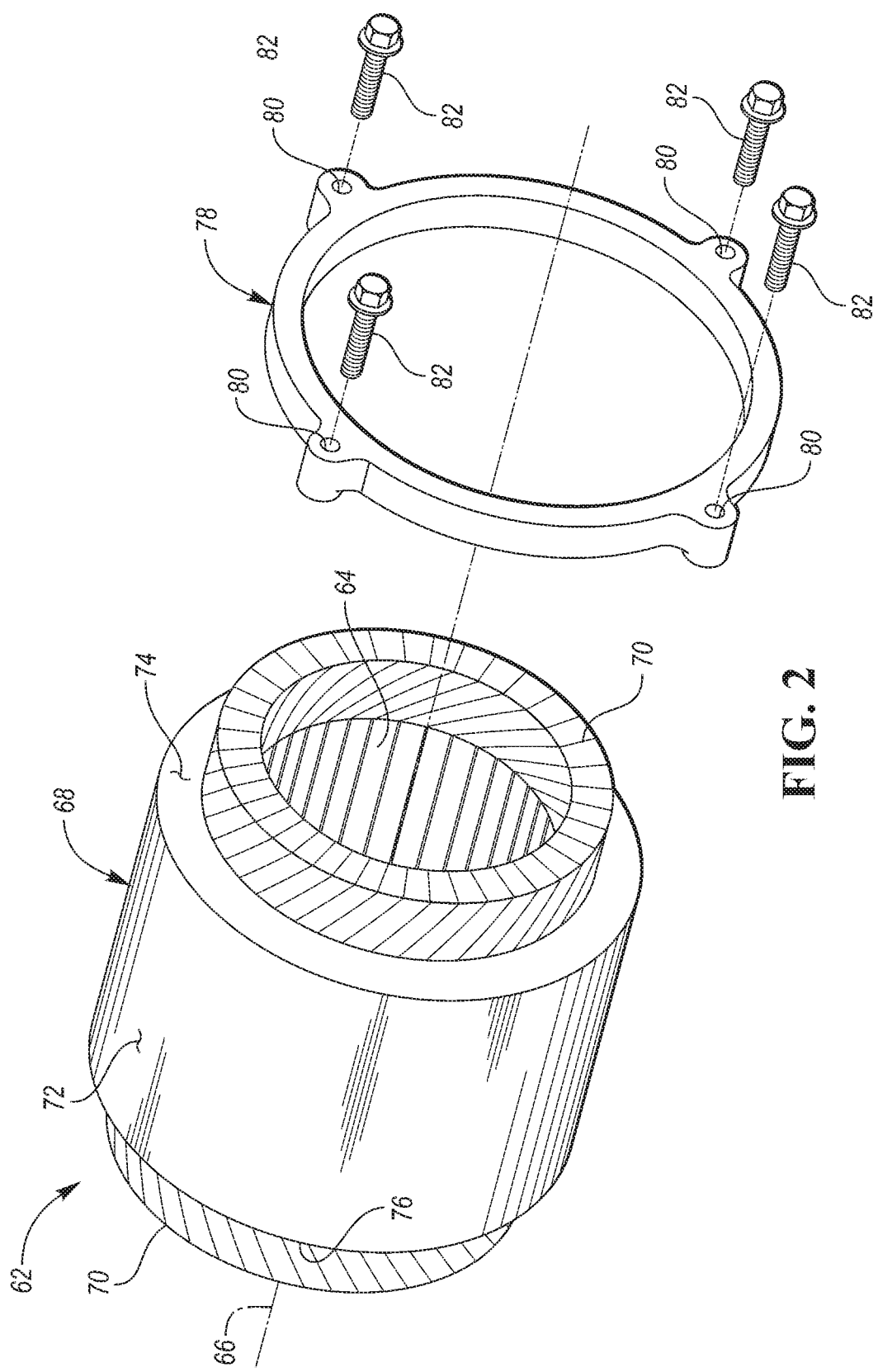
FIG. 2 is a perspective view of a stator of an electric machine and a clamp that is configured to secure the stator within a housing for the electric machine.

Referring to FIG. 2, a stator 62 of an electric machine is illustrated. More specifically, the stator 62 may be the stator of the M/G 18 described above. A rotor of the electric machine, which is generally disposed within an internal cavity 64 defined by the stator 62 and which is configured to rotate within the internal cavity 64 about a rotational axis 66, has been removed for illustrative purposes. The stator 62 includes a core 68 and end windings 70 that that protrude from axial ends the core 68. The stator 62 may include an external periphery or peripheral surface 72 that extends radially about the rotational axis 66. The external peripheral surface 72 may more specifically be an external surface of the core 68.

The stator 62 includes a first stepped-surface 74 and a second stepped-surface 76 that extend radially outward from stator 62. More specifically, the first stepped-surface 74 and the second stepped-surface 76 may extend radially outward from the rotational axis 66. The first stepped-surface 74 and the second stepped-surface 76 may be substantially perpendicular to the rotational axis 66 (i.e., the first stepped-surface 74 and the second stepped-surface 76 may face a direction that is axial relative to the stator 62 or a direction along the rotational axis 66). Substantially perpendicular may refer to any incremental value that is plus or minus 10° from exactly perpendicular. The first stepped-surface 74 and the second stepped-surface 76 may face opposing (i.e., opposite) axial directions relative to the stator 62 (e.g., directions that are opposite along the rotational axis 66). The core 68 may extend axially between a front surface and a back surface. The first stepped-surface 74 may be the back surface of the core 68 while the second stepped-surface 76 may be the front surface of the core 68.

A clamp 78 may be configured to engage the first stepped-surface 74 in order to secure the position of the stator 62. The clamp 78 may be a ring-shaped clamp that extends radially about the periphery (i.e., the external peripheral surface 72) of the stator 62. The clamp 78 may define through holes 80 that are configured to received fasteners 82. The fasteners 82 may be configured to engaged tapped holes within a housing such that the clamp secures the position of the stator 62 within the housing.

Figure 3:
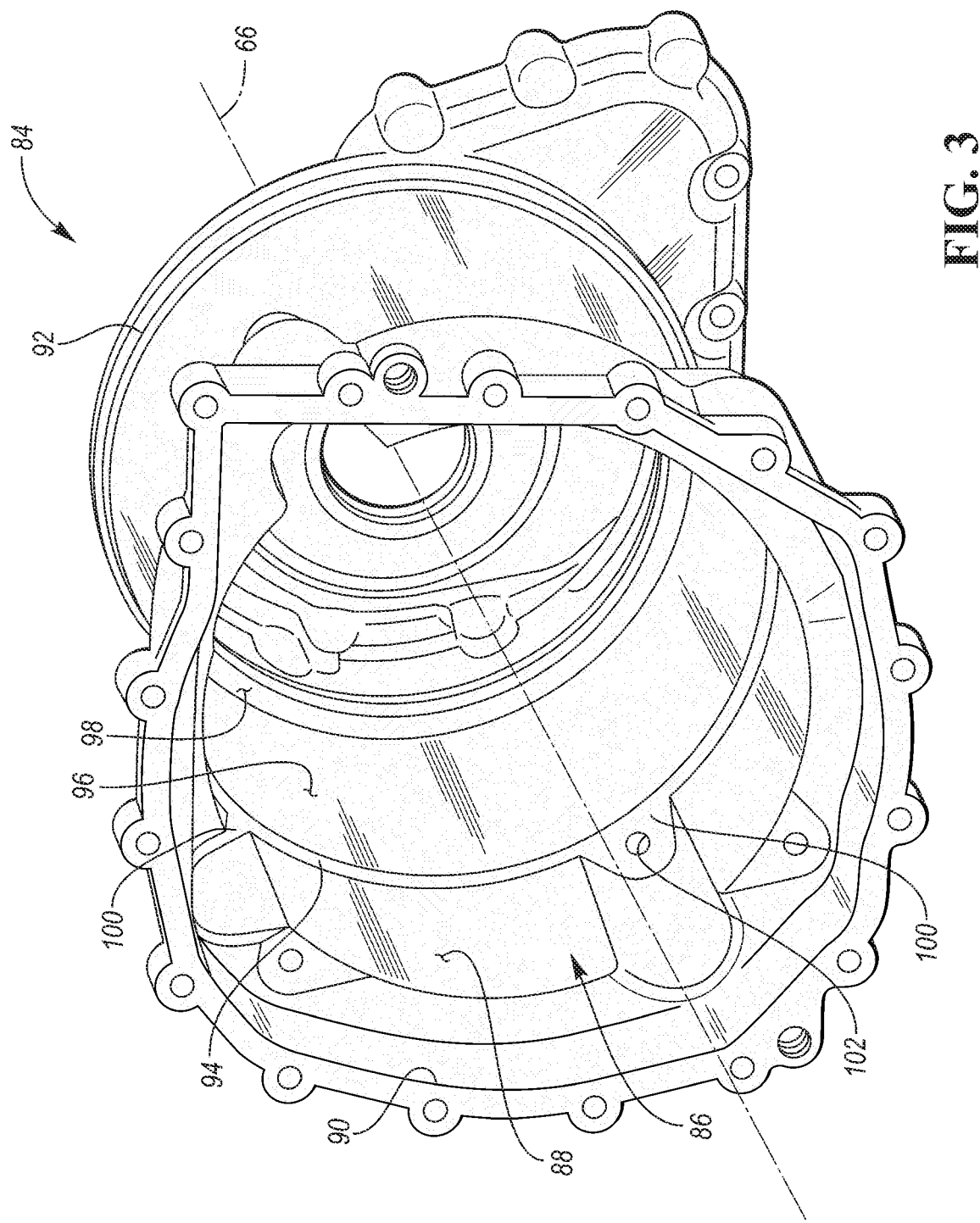
FIG. 3 is a perspective view of the housing for the electric machine.

Referring to FIG. 3, a perspective view of a housing 84 for the electric machine (including the stator 62) is illustrated. The rotational axis 66 is also illustrated with respect to the housing 84. The rotational axis 66 represents the axis at which the rotor of the electric machine will rotate once the electric machine is secured within the housing 84. The housing 84 defines an internal cavity 86. A first cylindrical surface 88 extends inward from a forward opening 90 of the housing 84 and into the cavity 86 towards a rear end 92 of the housing 84. The first cylindrical surface 88 is disposed radially about the rotational axis 66 and extends axially into the cavity 86 relative to the rotational axis 66 to a third-stepped surface 94. A second cylindrical surface 96 extends inward from the third-stepped surface 94 of the housing 84 and towards the rear end 92 of the housing 84. The second cylindrical surface 96 is disposed radially about the rotational axis 66 and extends axially into the cavity 86 relative to the rotational axis 66 to a fourth-stepped surface 98. The first cylindrical surface 88 and the second cylindrical surface 96 may be referred to as bores (i.e., the inside diameter of machined holes). The third stepped-surface 94 may separate the first cylindrical surface 88 from the second cylindrical surface 96. The first cylindrical surface 88 and the second cylindrical surface 96 may be substantially parallel relative to each other. Substantially parallel may refer to any incremental value that is between plus or minus 10° from exactly parallel. The second cylindrical surface 96 may be radially inward of the first cylindrical surface 94 relative to the rotational axis 66.

The third-stepped surface 94 and the fourth stepped-surface 98 may extend radially inward and into the cavity 86 relative to the rotational axis 66. The third-stepped surface 94 and the fourth stepped-surface 98 may be substantially perpendicular to the rotational axis 66 (i.e., the third-stepped surface 94 and the fourth stepped-surface 98 may face a direction that is axial along the rotational axis 66). The third-stepped surface 94 and the fourth stepped-surface 98 may be substantially perpendicular to the first cylindrical surface 88 and the second cylindrical surface 96. Substantially perpendicular may refer to any incremental value that is plus or minus 10° from exactly perpendicular. The third-stepped surface 94 and the fourth stepped-surface 98 may face the same axial direction relative to the rotational axis 66 (i.e., a direction along the rotational axis 66). The fourth stepped-surface 98 may be radially inward of the third-stepped surface 94 relative to the rotational axis 66. The third-stepped surface 94 is axially spaced apart from the and the fourth stepped-surface 98 via second cylindrical surface 96 and relative to the rotational axis 66.

The third stepped-surface 94 includes a plurality bulges or protrusions 100 that extend radially outward relative to the rotational axis 66. A threaded or tapped hole 102 that is configured to receive one of the fasteners 82 is defined by housing 84 along each of the protrusions 100. The tapped holes 102 may extend into the housing in the same direction as the rotational axis 66, and substantially perpendicular to the third stepped-surface 94 and plurality of protrusions 100.

Figure 4:
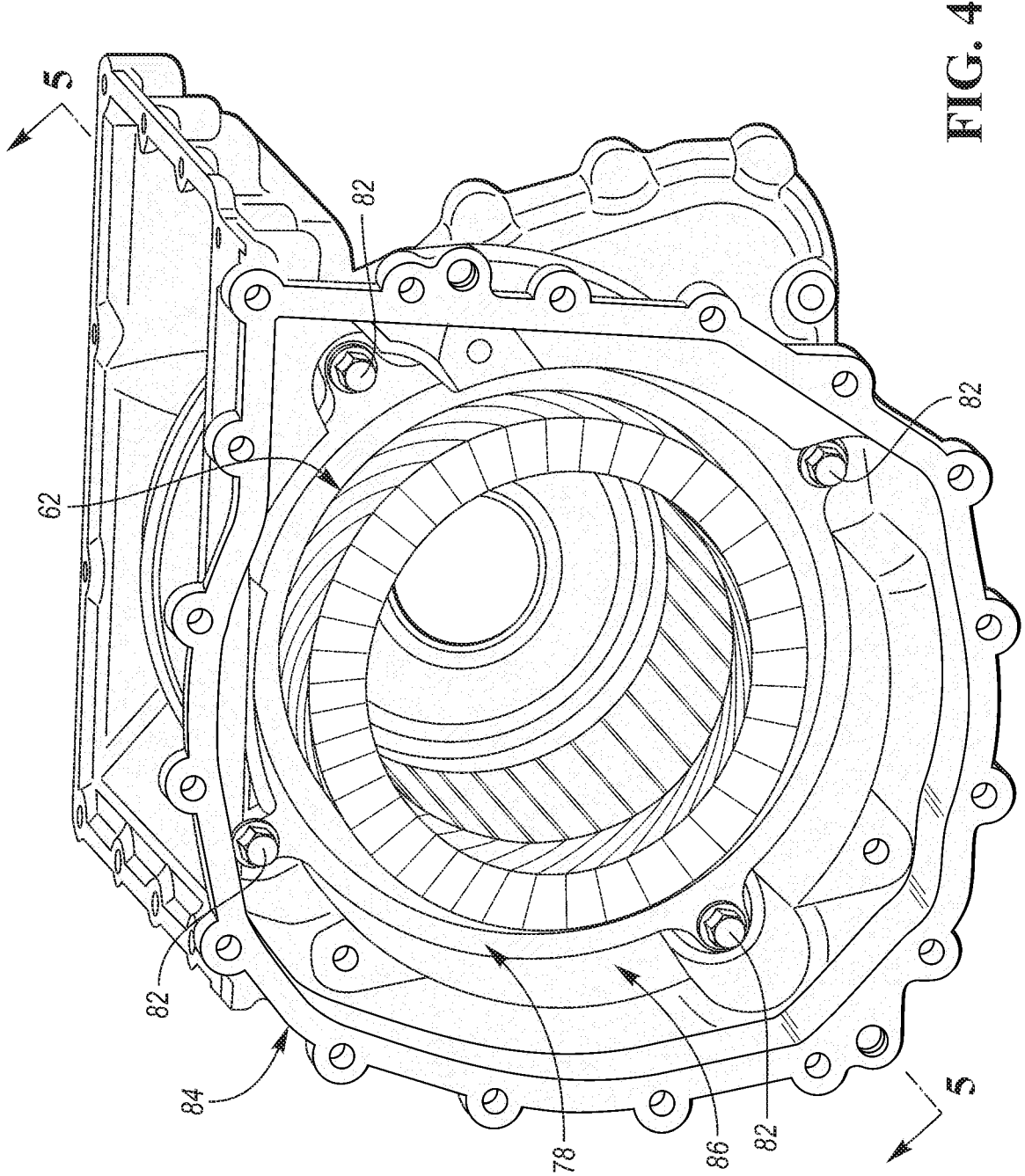
FIG. 4 is a perspective view of the housing with the stator disposed therein.

Referring to FIG. 4, a perspective view of the housing 84 with the stator 62 disposed within the cavity 86 of the housing 84 is illustrated. The clamp 78 is engaging both the stator 62 and the housing 84 to secure the stator 62 to the housing 84 within the cavity 86. More specifically, the pattern the through holes 80 defined by the clamp 78 are aligned with the pattern of tapped holes 102 defined by the housing 84, and each of the fasteners 82 are extending through one of the through holes 80 and engaging one the tapped holes 102 to secured the position of the clamp 78 such that the clamp 78 engages both the stator 62 and the housing 84 to secure the stator 62 to the housing 84.

Figure 5:
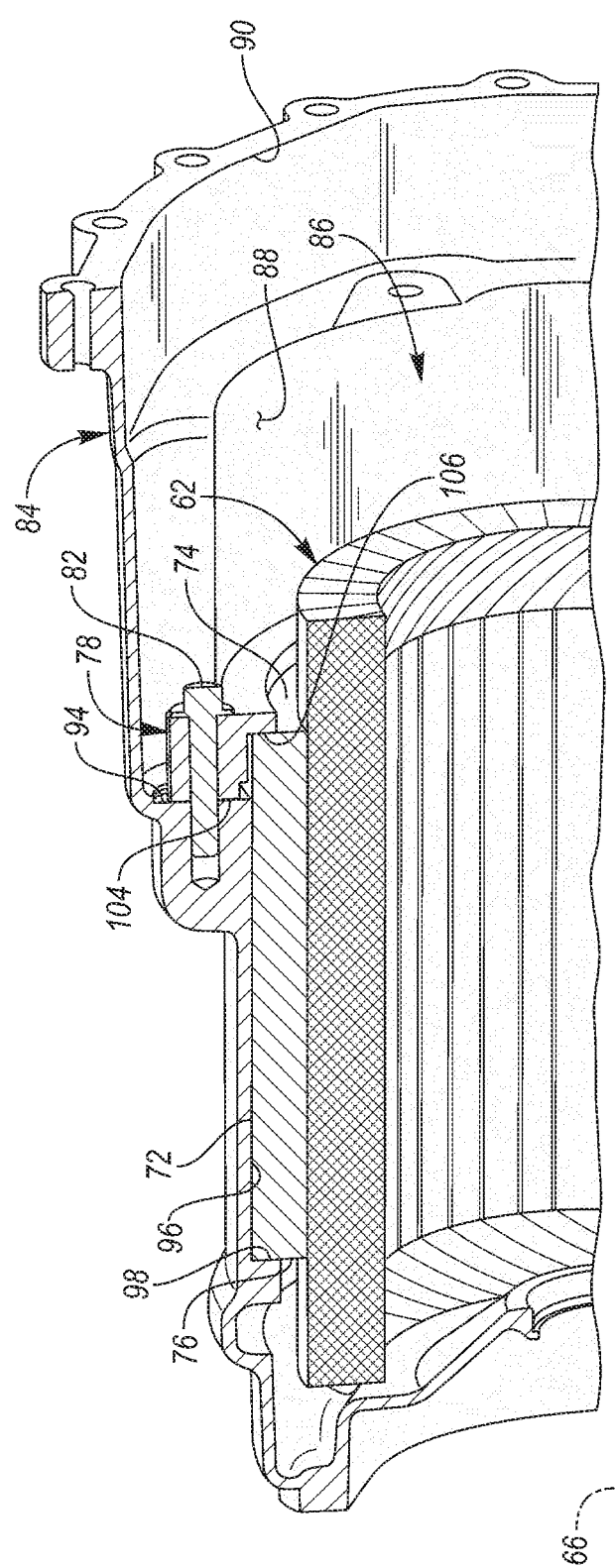
FIG. 5 is a cross-sectional view taken along line 5-5 in FIG. 4.

Referring to FIG. 5, a cross-sectional view taken along line 5-5 in FIG. 4 is illustrated. The clamp is engaging the first stepped-surface 74 located on the stator 62 and the third stepped surface 94 located on the housing 84. The engagement between the clamp 78 and the stepped-surfaces (i.e., the first stepped-surface 74 and the third stepped surface 94) generates an axial load (i.e., generates a load on the stator 62 in the direction along the rotational axis 66) on the stator and axially forces the second stepped surface 76 located on the stator 62 into engagement with the fourth stepped surface 98 located on the housing 84. This prevents any axial and radial movement of the stator 62, and eliminates any noise, vibration, or harshness (NVH) issues that may be caused by axial movement of the stator. The clamp 78 may include a primary surface 104 that engages the third stepped surface 94 and a secondary surface 106 that engages the first stepped-surface 74. The secondary surface 106 may be radially inward of the primary surface 104 relative to the rotational axis 66. The secondary surface 106 may be offset from of the primary surface 104. More specifically, the secondary surface 106 may be axially (i.e., in a direction along the rotational axis 66) offset from the primary surface 104. The secondary surface 106 may be substantially parallel with the primary surface 104. Substantially parallel may refer to any incremental value that is between plus or minus 10° from exactly parallel.

It should be understood that the designations of first, second, third, fourth, etc. for stepped-surfaces, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a housing having an internal surface, defining an internal cavity, and having first and second stepped surfaces, the first and second stepped surfaces each positioned axially inward relative to an end of the housing that defines an opening to the cavity, and the first and second stepped surfaces each extending radially inward and into the cavity relative to the internal surface;

an electric machine disposed within the cavity, configured to propel the vehicle, and having a stator that includes third and fourth stepped surfaces extending radially outward; and a clamp engaging the first and third stepped surfaces, and axially forcing the fourth stepped surface into engagement with the second stepped surface.

2. The vehicle of claim 1, wherein the second stepped surface is radially inward of the first stepped surface.

3. The vehicle of claim 1, wherein the second stepped surface is axially spaced from the first stepped surface.

4. The vehicle of claim 1, wherein the third and fourth stepped surfaces face opposing axial directions.

5. The vehicle of claim 1, wherein the clamp includes a primary surface engaging the first stepped surface and a secondary surface, that is offset from and radially inward of the primary surface, engaging the third stepped surface.

6. The vehicle of claim 1, wherein the clamp is a ring clamp that extends radially about a periphery of the stator.

7. The vehicle of claim 1, wherein the clamp defines a plurality of through holes arranged in a pattern and the housing defines a plurality of threaded holes that are configured to align with the pattern of through holes.

8. The vehicle of claim 7 further comprising a plurality of fasteners securing the clamp to the housing, each fastener extending through one of the through holes and engaging one of the threaded holes.

9. A powertrain comprising:
a housing having an internal surface, defining an internal cavity, and having first and second stepped surfaces, the first and second stepped surfaces each positioned axially inward relative to an end of the housing that defines an opening to the cavity, the first and second stepped surfaces each extending radially into the cavity relative to the internal surface, and the second stepped surface being radially inward of the first stepped surface;

an electric machine stator having a core that extends axially between front and back surfaces; and a clamp engaging the first stepped surface and the back surface, and forcing the front surface into engagement with the second stepped surface.

10. The powertrain of claim 9, wherein the second stepped surface is axially spaced from the first stepped surface.

11. The powertrain of claim 9, wherein the front and back surfaces face opposing axial directions.

12. The powertrain of claim 9, wherein the clamp includes a primary surface engaging the first stepped surface and a secondary surface, that is offset from and radially inward of the primary surface, engaging the back surface.

13. The powertrain of claim 9, wherein the clamp is a ring clamp that extends radially about a periphery of the stator.

14. The powertrain of claim 9, wherein the clamp defines a plurality of through holes arranged in a pattern and the housing defines a plurality of threaded holes that are configured to align with the pattern of through holes, and further comprising a plurality of fasteners securing the clamp to the housing, each fastener extending through one of the through holes and engaging one of the threaded holes.

15. A vehicle powertrain comprising:
a housing having an internal surface, defining an internal cavity, and having first and second surfaces, the first and second stepped surfaces each positioned axially inward relative to an end of the housing that defines an opening to the cavity, and the first and second stepped surfaces each extending radially into the cavity relative to the internal surface;

an electric machine stator having third and fourth surfaces extending radially outward; and a clamp engaging the first and third surfaces, and generating an axial load on the stator that forces the fourth surface into engagement with the second surface.

16. The vehicle powertrain of claim 15, wherein the second stepped surface is radially inward of the first stepped surface.

17. The vehicle powertrain of claim 15, wherein the clamp includes a primary surface engaging the first surface and a secondary surface, that is offset from and radially inward of the primary surface, engaging the third surface.

18. The vehicle of claim 7, wherein the first stepped surface includes a plurality of radially outward extending protrusions, and wherein each of the radially outward extending protrusions defines one of the of threaded holes.

19. The powertrain of claim 14, wherein the first stepped surface includes a plurality of radially outward extending protrusions, and wherein each of the radially outward extending protrusions defines one of the of threaded holes.

20. The vehicle powertrain of claim 15, wherein the clamp defines a plurality of through holes arranged in a pattern and the housing defines a plurality of threaded holes that are configured to align with the pattern of through holes, and further comprising a plurality of fasteners securing the clamp to the housing, each fastener extending through one of the through holes and engaging one of the threaded holes, wherein the first stepped surface includes a plurality of radially outward extending protrusions, and wherein each of the radially outward extending protrusions defines one of the of threaded holes.

* * * * *